United States Patent
Fornara et al.

(10) Patent No.: US 11,715,705 B2
(45) Date of Patent: Aug. 1, 2023

(54) METHOD FOR PROTECTING DATA STORED IN A MEMORY, AND CORRESPONDING INTEGRATED CIRCUIT

(71) Applicant: STMicroelectronics (Rousset) SAS, Rousset (FR)

(72) Inventors: Pascal Fornara, Pourrieres (FR); Fabrice Marinet, Chateauneuf le Rouge (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 412 days.

(21) Appl. No.: 16/932,082

(22) Filed: Jul. 17, 2020

(65) Prior Publication Data
US 2021/0028128 A1 Jan. 28, 2021

(51) Int. Cl.
*H01L 29/788* (2006.01)
*G06F 21/75* (2013.01)
*G06F 21/79* (2013.01)
*H01L 23/522* (2006.01)
*H10B 41/35* (2023.01)
(Continued)

(52) U.S. Cl.
CPC ............ *H01L 23/573* (2013.01); *G06F 21/75* (2013.01); *G06F 21/79* (2013.01); *H01L 23/5223* (2013.01); *H01L 23/576* (2013.01); *H01L 29/7883* (2013.01); *H10B 41/35* (2023.02); *G06F 21/87* (2013.01)

(58) Field of Classification Search
CPC ... H01L 23/5223; H01L 23/57; H01L 23/573; H01L 23/576; H01L 27/11524; H01L 29/7883; G06F 21/75; G06F 21/79; G06F 21/87; H10B 41/35
See application file for complete search history.

(56) References Cited

U.S. PATENT DOCUMENTS 6,856,581 B1 2/2005 Berstis et al.
8,022,460 B2 9/2011 Yamazaki et al.
(Continued)

FOREIGN PATENT DOCUMENTS

EP 1293988 A2 3/2003
EP 1400887 A1 3/2004
(Continued)

OTHER PUBLICATIONS

INPI Search Report and Written Opinion for FR 1908376 dated Apr. 3, 2020 (9 pages).

*Primary Examiner* — Herve-Louis Y Assouman
*Assistant Examiner* — Christopher M Roland
(74) *Attorney, Agent, or Firm* — Crowe & Dunlevy

(57) ABSTRACT

An integrated circuit memory includes a state transistor having a floating gate which stores a respective data value. A device for protecting the data stored in the memory includes a capacitive structure having a first electrically-conducting body coupled to the floating gate of the state transistor, a dielectric body, and a second electrically-conducting body coupled to a ground terminal. The dielectric body is configured, if an aqueous solution is brought into contact with the dielectric body, to electrically couple the floating gate and the ground terminal so as to modify the charge on the floating gate and to lose the corresponding data. Otherwise, the dielectric body is configured to electrically isolate the floating gate and the ground terminal.

29 Claims, 6 Drawing Sheets

(51) Int. Cl.
*H01L 23/00* (2006.01)
*G06F 21/87* (2013.01)

(56) References Cited

U.S. PATENT DOCUMENTS

| | | | |
|---|---|---|---|
| 8,304,313 | B2 | 11/2012 | Tanaka et al. |
| 8,378,710 | B1 | 2/2013 | Al-Kadi et al. |
| 8,729,668 | B2 | 5/2014 | Fornara et al. |
| 9,025,373 | B2 | 5/2015 | Tatsumura et al. |
| 2005/0104161 | A1 | 5/2005 | Matsuno |
| 2005/0201158 | A1 | 9/2005 | Rosa |
| 2006/0028340 | A1 | 2/2006 | Hooghan et al. |
| 2006/0090211 | A1 | 4/2006 | Stidl et al. |
| 2012/0199948 | A1* | 8/2012 | Saisse .................... G06F 21/87 |
| | | | 257/532 |
| 2013/0032926 | A1 | 2/2013 | Fornara et al. |
| 2013/0134499 | A1 | 5/2013 | Tatsumura et al. |
| 2013/0193437 | A1 | 8/2013 | Lisart et al. |
| 2013/0314121 | A1 | 11/2013 | Mougin et al. |
| 2014/0375303 | A1 | 12/2014 | Helfmeier et al. |
| 2016/0042199 | A1 | 2/2016 | Joharapurkar et al. |
| 2016/0328578 | A1 | 11/2016 | Plusquellic et al. |
| 2019/0043814 | A1* | 2/2019 | Marzaki ................. G06F 21/75 |
| 2020/0035624 | A1 | 1/2020 | Marinet et al. |

FOREIGN PATENT DOCUMENTS

| | | |
|---|---|---|
| EP | 2680184 A1 | 1/2014 |
| FR | 2938953 A1 | 5/2010 |
| FR | 2985059 A1 | 6/2013 |

\* cited by examiner

METHOD FOR PROTECTING DATA STORED IN A MEMORY, AND CORRESPONDING INTEGRATED CIRCUIT

PRIORITY CLAIM

This application claims the priority benefit of French Application for Patent No. 1908376, filed on Jul. 24, 2019, the content of which is hereby incorporated by reference in its entirety to the maximum extent allowable by law.

TECHNICAL FIELD

The various embodiments and their implementation relate to the protection of data stored in an integrated circuit memory, in particular, against reverse engineering.

BACKGROUND

Reverse engineering techniques can enable the entire physical structure of an integrated circuit to be reconstructed, and also data contained within non-volatile memories of the integrated circuits to be recovered, in particular secret data.

The data must be kept secret, for example, if it constitutes a key element for analyzing the operation of the integrated circuit or if it contains an encryption/decryption key, identification or authentication information, or for any other reason.

Recovery of the data from non-volatile memories typically comprises nanometric probing techniques, passive voltage contrast (PVC) techniques, or electron beam induced current (EBIC) techniques.

These techniques require an access to the reverse-analyzed parts of the integrated circuit via the front face so as to typically place probes in contact with them, or via the rear face so as to access floating gates of the memory cells.

The front face is conventionally the face of the semiconductor substrate of the integrated circuit on which the transistors are formed, and on top of which is typically found an interconnection part (usually denoted by the acronym BEOL for "Back End of Line").

The rear face is the face opposite to the front face of the substrate.

In order to gain access to the reverse-analyzed parts of the integrated circuit, the integrated circuit is typically machined either mechanically or by the use of a focused ion beam (FIB) or by plasma ablation.

The mechanical, or chemical-mechanical, machining of the front face notably allows the interconnection part to be delayered, level by level, in order to reconstitute the interconnections. The mechanical machining typically comprises a mechanical polishing lubricated with water, or potentially with chemical compounds in aqueous solution. On the rear face, this technique allows the circuit to be thinned.

Machining by focused ion beam FIB allows nanometric etches to be implemented for example in order to reach, via the rear face, the neighborhood of a floating gate in order to observe its electrical behavior, for example by PVC or EBIC, and to deduce from this the stored information. The FIB technique via the front face also allows the interconnection levels to be accessed.

Conventional devices for detection of reverse engineering are not effective for detecting the methods described hereinabove if the integrated circuit is not powered, or if the functionality of the integrated circuit is destroyed.

Thus, it is desirable to improve the techniques for protecting the data stored within integrated circuit memories, and against all the types of attack.

SUMMARY

According to one aspect, a method is provided for protecting data stored in a memory of an integrated circuit, comprising: the fabrication of the memory comprising the fabrication of at least one state transistor comprising a floating gate, and the writing of a respective data value into each state transistor comprising a storage of a charge representative of the data in the floating gate of the state transistor; the fabrication of a protection device comprising the formation, for at least one state transistor, of at least one capacitive structure comprising a first electrically-conducting body coupled to the floating gate of the state transistor, a dielectric body, and a second electrically-conducting body coupled to a ground terminal, in which the dielectric body is configured for electrically coupling the floating gate and the ground terminal so as to modify the charge on the floating gate and to lose the corresponding data if an aqueous solution is brought into contact with the dielectric body, and for electrically isolating the floating gate and the ground terminal otherwise.

In other words, the state transistor storing the data is connected to capacitive structures which play the role of antennas whose aim is to lose the stored information in the case of reverse engineering.

Indeed, in the case of contact with an aqueous solution, the two electrically-conducting bodies of the capacitive structure will be electrically coupled. The floating gate thus coupled with the ground terminal of the integrated circuit will naturally lose its charge, and hence the information that this charge represented will be lost.

Furthermore, in the case of application of a beam of electrically-charged particles, for example of the focused ion beam (FIB) type, the first electrically-conducting body will collect the charges of the beam and thus modify the charge on the floating gate, and hence the information that this charge represented will be lost.

Thus, the loss of the stored data takes place intrinsically, without having to functionally activate or to power the integrated circuit.

Of course, the structures referred to as capacitive are not intended to provide a capacitive effect, and may advantageously be configured for this purpose, but are denoted thus because of their structure having two conducting bodies, insulated by a dielectric body, which resembles a capacitor structure.

According to one embodiment, the fabrication of each capacitive structure of the protection device comprises the formation of the first electrically-conducting body and of the second electrically-conducting body within the same metal level of an interconnection part of the integrated circuit, the second electrically-conducting body being configured to have a shape matching at least a part of the outline of the shape of the first electrically-conducting body.

Thus, implementing a mechanical polishing of the conventional interconnection levels will generate a coupling between the electrically-conducting bodies of the capacitive structures and the loss of the information contained in the memory.

According to one embodiment, the method comprises the fabrication of several state transistors and of several capacitive structures respectively for the several state transistors, the respective capacitive structures being fabricated within different metal levels from one capacitive structure to another.

This will complicate attempts to avoid the device for protecting the data stored in the memory, given that it will be necessary to reproduce the attempts separately within each metal level comprising the respective capacitive structures.

According to one embodiment, the formation of the dielectric material is included in the formation of a layer of inter-metal dielectric of the metal level within which the respective electrically-conducting bodies are formed.

Such a dielectric material may be configured for electrically coupling the first and the second conducting body if an aqueous solution is brought into contact with the dielectric body, and for electrically isolating it otherwise, for example if its structure is sufficiently narrow between the first electrically-conducting body and the second electrically-conducting body.

According to one embodiment, in the fabrication of each capacitive structure, the formation of the first electrically-conducting body comprises the formation of a first metal track extending in a direction of the plane of the respective metal level, and the formation of the second electrically-conducting body comprises the formation of a second metal track alongside the first metal track.

This embodiment offers the advantage of being simple and effective, and of facilitating the integration of the data protection device into existing integrated circuits.

According to one embodiment, the method further comprises the fabrication of at least a first compensation capacitive structure comprising a third electrically-conducting body coupled to a control gate of the state transistor, the control gate being situated on top of the floating gate, the third electrically-conducting body being configured so as to be capacitively coupled with the first conducting body of the at least one capacitive structure of the device.

According to one embodiment, the fabrication of the data protection device further comprises the formation of at least one trench filled with a conductive material extending vertically in depth into a semiconductor substrate of the integrated circuit, the conductive material filling each trench being electrically coupled to the floating gate of a respective state transistor.

This embodiment advantageously allows the stored data to be lost in the case of an approach via the rear face of the substrate with a beam of electrically-charged particles. Indeed, the conductive material filling the trench will collect the charges of the beam in depth in the substrate and thus modify the charge on the floating gate, and hence the information that this charge represented will be lost.

According to one embodiment, the method further comprises the fabrication of at least a second compensation capacitive structure comprising a second trench filled with a conductive material electrically coupled to a control gate of the state transistor, the control gate lying on top of the floating gate, the conductive material filling the at least one second trench being configured so as to be capacitively coupled with the conductive material filling the at least one trench of the data protection device.

According to some embodiments, the formation of the at least one trench filled with a conductive material, and/or the formation of the at least one second trench are executed simultaneously with the formation of a vertical gate region of a buried transistor coupled to each state transistor.

Furthermore, the data written into each state transistor is advantageously intended to be read in order to implement a function of the integrated circuit, such as a code of instructions for booting up the integrated circuit, or such as an encryption/decryption key.

Thus, according to one embodiment, in the case of implementation of a reverse engineering comprising at least one mechanical polishing, or a focused ion beam machining via the front face or via the rear face, the data being itself the object of this reverse engineering are intrinsically lost.

According to another aspect, an integrated circuit is provided comprising: a memory comprising at least one state transistor comprising a floating gate, each state transistor storing a charge representative of a respective data value in its floating gate; a device for protecting the data stored in the memory comprising, for at least one state transistor, at least one capacitive structure comprising a first electrically-conducting body coupled to the floating gate of the state transistor, a dielectric body, and a second electrically-conducting body coupled to a ground terminal, in which the dielectric body is configured for electrically coupling the floating gate and the ground terminal so as to modify the charge on the floating gate and to lose the corresponding data if an aqueous solution is brought into contact with the dielectric body, and for electrically isolating the floating gate and the ground terminal otherwise.

According to one embodiment, the first electrically-conducting body and the second electrically-conducting body of each capacitive structure of the protection device are situated within the same metal level of an interconnection part of the integrated circuit, the second electrically-conducting body having a shape matching at least a part of the outline of the shape of the first electrically-conducting body.

According to one embodiment, in each capacitive structure, the first electrically-conducting body comprises a first metal track extending in a direction of the plane of the respective metal level, and the second electrically-conducting body comprises the formation of a second metal track alongside the first metal track.

According to one embodiment, the integrated circuit comprises several state transistors and several respective capacitive structures, the capacitive structures being situated within different metal levels from one capacitive structure to another.

According to one embodiment, the dielectric material is included within a layer of inter-metal dielectric of the metal level within which the respective electrically-conducting bodies are situated.

According to one embodiment, the integrated circuit further comprises at least a first compensation capacitive structure, comprising a third electrically-conducting body coupled to a control gate of the at least one state transistor, the control gate lying on top of the floating gate, the third electrically-conducting body being configured so as to be capacitively coupled with the first conducting body of the at least one capacitive structure.

According to one embodiment, the data protection device further comprises at least one trench filled with a conductive material extending vertically in depth into a semiconductor substrate of the integrated circuit, the conductive material filling each trench being electrically coupled to the floating gate of a respective state transistor.

According to one embodiment, the integrated circuit further comprises at least a second compensation capacitive structure comprising a second trench filled with a conductive material, the conductive material filling the second trench being configured so as to be capacitively coupled with the conductive material filling the at least one trench of the data protection device.

According to one embodiment, the at least one trench filled with a conductive material and/or the at least a second trench filled with a conductive material have the same structure and comprise the same materials as a vertical gate of a buried transistor coupled to each state transistor.

According to one embodiment, the data stored in each state transistor is intended to be read in order to implement a function of the integrated circuit, such as a code of instructions for booting up the integrated circuit, or such as an encryption/decryption key.

BRIEF DESCRIPTION OF THE DRAWINGS

Other advantages and features of the invention will become apparent upon examining the detailed description of embodiments and their implementation, which are in no way limiting, and from the appended drawings in which.

DETAILED DESCRIPTION

Figure 1A:
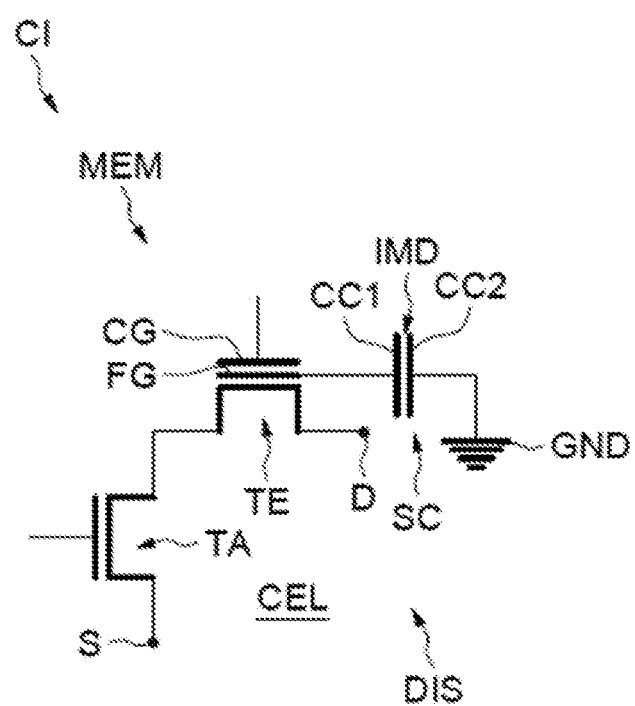
FIG. 1A shows an electrical circuit diagram of a memory cell of an integrated circuit memory.

FIG. 1A shows an electrical circuit diagram of a memory cell CEL of a memory MEM of an integrated circuit CI.

Figure 1B:
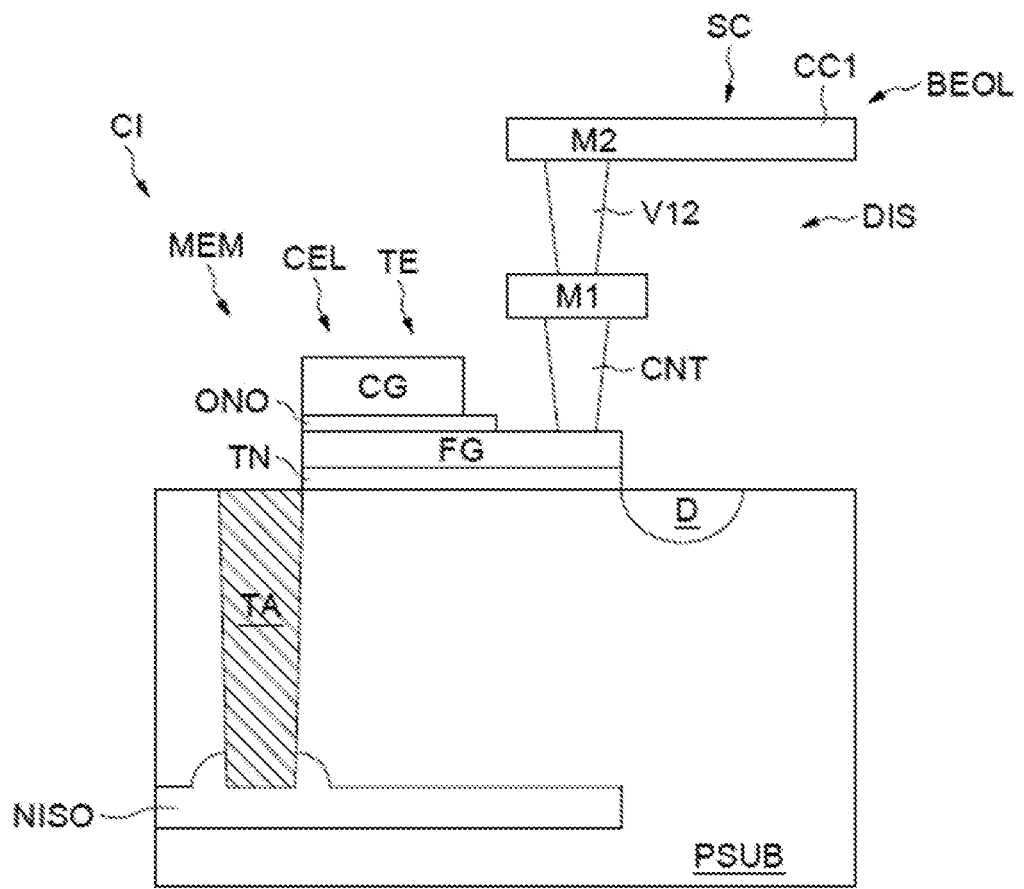
FIG. 1B shows a cross-sectional view of the memory cell of FIG. 1A.

FIG. 1B shows a cross-sectional view of the same memory cell CEL fabricated within and on a semiconductor substrate PSUB of the integrated circuit CI.

The memory cell CEL comprises an access transistor TA, allowing the memory cell CEL to be selected from amongst others in the non-volatile memory MEM, according to one example of configuration of buried vertical gate transistor.

The gate of the access transistor TA is formed by a conductive material, for example polycrystalline silicon, filling a trench opened in the substrate PSUB whose walls have been covered with a gate oxide. A buried semiconductor region NISO on the bottom of the trench forms a source region S of the access transistor TA.

The memory cell CEL further comprises a state transistor TE allowing a data value to be stored. The state transistor TE comprises a floating gate FG and a control gate CG.

The data stored in the state transistor TE is written in order to be read in support of the implementation of a function of the integrated circuit CI. The state transistor TE can store any type of data, in particular data that must be kept secret. For example, the data code instructions for booting up the integrated circuit or contain an encryption/decryption key.

In order to write a data value into the state transistor TE, charges are injected by the Fowler-Nordheim effect through a dielectric tunnel TN between the floating gate FG and a drain region D.

The control gate CG is electrically isolated from the floating gate FG by a dielectric region of the silicon oxide-nitride-oxide ONO type. The control gate CG allows electric fields to be generated for the Fowler-Nordheim effect, and for reading the stored data. The reading is based on a measurement of the threshold voltage on the control gate CG of the state transistor TE, which depends on the charge on the floating gate FG.

Thus, the charge on the floating gate FG in each state transistor TE is representative of a respective data value.

The integrated circuit CI further comprises a device DIS for protecting the data stored in the memory MEM, allowing the information contained in the data of the memory MEM to be lost in the case of an implementation of a reverse engineering on the integrated circuit CI.

The device DIS comprises a capacitive structure SC comprising a first electrically-conducting body CC1 coupled to the floating gate FG of the state transistor TE, a dielectric body IMD, and a second electrically-conducting body CC2 (see, FIG. 1A, where the second electrically-conducting body CC2 is not visible in the cross-sectional plane in FIG. 1B) coupled to a ground terminal GND.

However, the capacitive structure SC is not intended to produce a capacitive effect on the state transistor TE, and its capacitive value may be configured in such a manner as to produce a negligible effect with respect to the coupling factor of the cell.

The coupling factor of the cell is the ratio of the capacitance between the control gate CG and the floating gate FG over the capacitance between the floating gate FG and the substrate PSUB. This factor is key for the programming and the erasing of the cell.

The dielectric body IMD is configured with a low dielectric constant, generally with a porous structure, and for example made of silicon oxide. The effect of this is that the relative permittivity of the dielectric body IMD increases if it is brought into contact with water, for example into contact with an aqueous solution lubricating a mechanical polishing operation such as may be performed during reverse engineering.

When the permittivity of the dielectric body IMD increases, the quantity of current leaking increases, which produces an electrical coupling between the first electrically-conducting body CC1 and the second electrically-conducting body CC2 of the capacitive structure SC. Thus, the floating node (stored charge) in the floating gate FG of the state transistor TE discharges towards ground GND, irrespective of its sign (polarity).

The dielectric body is furthermore configured for electrically isolating the first electrically-conducting body CC1, and the second electrically-conducting body CC2 in its normal state, in other words not having been brought into contact with an aqueous solution.

Thus, the dielectric body is configured for electrically coupling the floating gate FG and the ground terminal GND, so as to modify the charge on the floating gate FG and to lose the corresponding data, if an aqueous solution is brought into contact with the dielectric body IMD; the dielectric body IMD is, in parallel, configured for electrically isolating the floating gate FG and the ground terminal GND otherwise.

As can be seen in FIG. 1B, the capacitive structure SC is formed within a metal level M2 of the Back End of Line (BEOL) interconnection part of the integrated circuit.

The floating gate FG of the state transistor TE is coupled to the first electrically-conducting body CC1 by means of a contact CNT, connecting the elements of the front face of the substrate PSUB with the first metal level M1, and by means of vias V12 connecting two successive metal levels.

Thus, in the case of the implementation of a reverse engineering comprising a mechanical or chemical-mechanical polishing of the interconnection part BEOL of the integrated circuit CI, the liquid lubricant of the polishing will generate a coupling between the floating gate and the ground terminal GND and the stored data will be lost.

This loss of data is obtained intrinsically without needing to power the integrated circuit CI.

Although shown for the sake of simplicity in the second metal level M2, the capacitive structure SC of the device DIS may advantageously be formed in higher metal levels, without limitation, for example the fifth, the sixth or the seventh metal level.

Indeed, it is advantageous for the data to be lost as soon as possible in the process of mechanical machining of the interconnection part BEOL.

Accordingly, the device DIS for protecting the data stored in the memory MEM may comprise, for the same state transistor TE, several capacitive structures SC within several metal levels in order to enhance the loss of the data.

Figure 2:
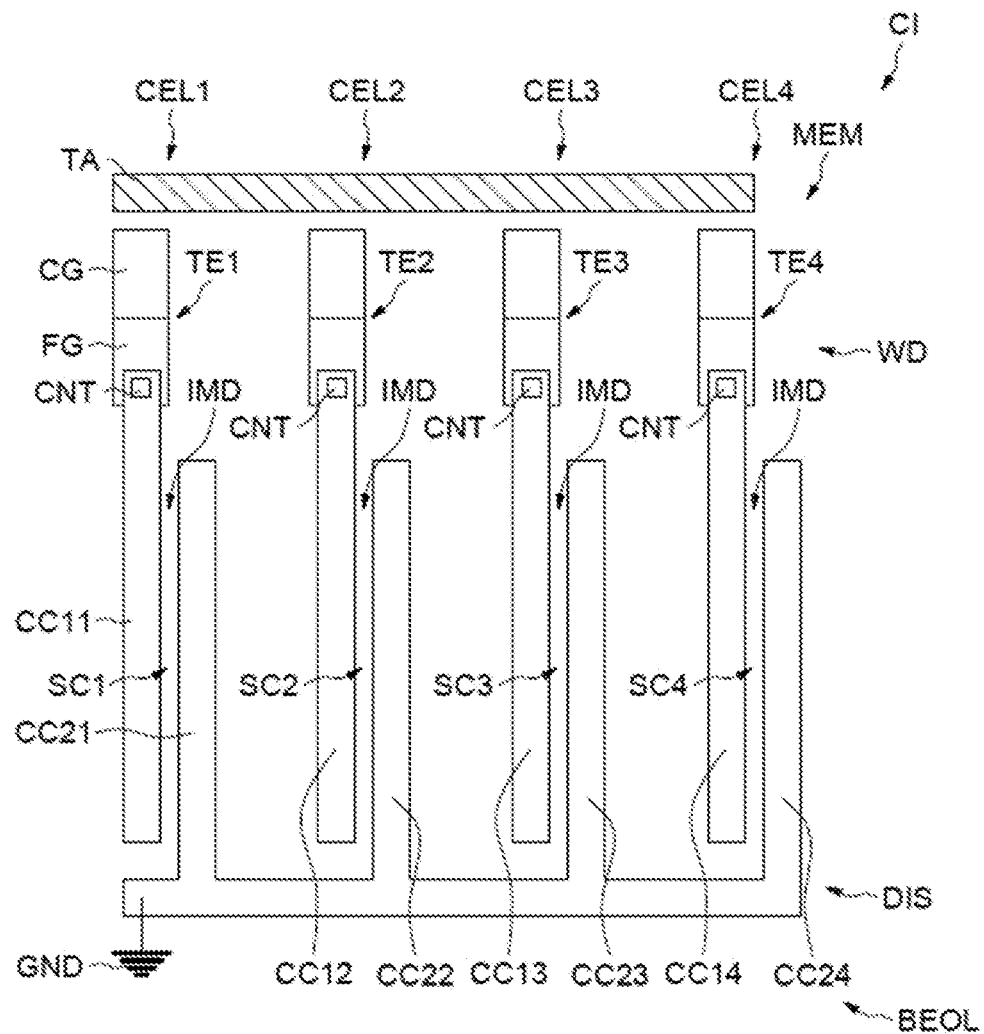
FIG. 2 shows a top view of the integrated circuit memory.

FIG. 2 shows a view from the top of the memory MEM of the integrated circuit CI.

The memory MEM conventionally comprises several memory cells CEL1, CEL2, CEL3, CEL4 such as described in relation with FIGS. 1A and 1B, for example assembled by memory word WD.

Thus, the memory cells CEL1-CEL4 each comprise a state transistor TE1-TE4, and share the structure of the access transistor TA within a memory word WD.

The protection device DIS comprises (at least) one capacitive structure SC1-SC4 per state transistor TE1-TE4, each within a respective metal level. Thus, the capacitive structures SC1-SC4 may be situated in various metal levels, the metal levels varying from one capacitive structure to another.

For this reason, it is more difficult to detect and potentially to avoid the device DIS for protecting the data stored in the memory MEM.

In each capacitive structure SC1-SC4, the first electrically-conducting body CC11-CC14 and the second electrically-conducting body CC21-CC24 are situated within the same metal level of the interconnection part BEOL of the integrated circuit CI.

The second electrically-conducting body CC21-CC24 has a shape matching at least a part of the outline of the shape of the first electrically-conducting body CC11-CC14.

In the example shown, each first electrically-conducting body CC11-CC14 is formed by a first metal track extending in a direction of the plane of the metal level. The second electrically-conducting bodies CC21-CC24 are respectively formed by second metal tracks alongside (for example, extending longitudinally in parallel) each first metal track.

The second electrically-conducting bodies CC21-CC24 are furthermore all connected, for example by a metal track perpendicular to the others, in order to couple them to the ground terminal GND.

In other words, the capacitive structures may comprise a structure in the form of interleaved combs between the first electrically-conducting bodies CC11-CC14 and the second electrically-conducting bodies CC21-CC24. The interstices between the electrically-conducting bodies are filled by the dielectric body IMD. The structures belong to the plane of the respective metal level.

The dielectric material IMD configured so that its permittivity increases in the case of contact with an aqueous solution may, for example, be directly formed by a layer of inter-metal dielectric provided between the metal levels of the interconnection part BEOL, if the inter-metal dielectric layer provided exhibits the features of the dielectric bodies of the capacitive structures SC, such as described hereinbefore.

Furthermore, the first electrically-conducting bodies CC1 can capture charged particles striking them, in particular in the case of a reverse engineering implementing a machining of the interconnection part BEOL with a beam of charged particles such as a focused ion beam (FIB).

Furthermore, in the case of application of a beam of electrically-charged particles, for example of the FIB type, the first electrically-conducting body will collect the charges from the beam and thus modify the charge on the floating gate, and hence the information that this charge represented will be lost.

Reference is made here to United States Patent Application Publication No. 2020/0035624, incorporated by reference, which describes the use of metal plates in a detector of an attack using a beam of charged particles, which performs a measurement in order to detect whether an attack has taken place. This disclosure offers the advantage of being able to detect, everywhere in the integrated circuit, an attack having taken place even though the circuit was not yet powered at the time of the attack.

However, in the present device DIS for protecting the data stored in the memory MEM, when the first electrically-conducting body collects the charges from the beam of ions, the charge on the floating gate of the memory is modified, and hence the data that this charge represented will be lost, even if the integrated circuit is never powered up.

Indeed, the data stored by each state transistor TE of the memory word WD of the memory MEM is intended for a use different from an attack detection and comprises in particular secret data. It is recalled that the data are intended to be read in order to implement a function of the integrated circuit CI, for example data coding instructions for booting up the integrated circuit, or data of an encryption/decryption key.

In summary, the capacitive structures SC such as presented hereinbefore provide a double use, without compromise, allowing two types of methods of reverse engineering to be detected with one single structure.

The capacitive structures SC are advantageously formed near to the respective state transistor TE, in order to optimize the chances of capturing the charged particles from a machining by FIB aimed at reaching the state transistor TE, and a mechanical polishing aimed at reaching and analyzing the memory MEM.

In this context, the phrase "near to the state transistor TE" is understood to mean that the capacitive structures are, of course, localized in a region situated in a plane parallel to the front face on which the state transistor TE is formed, and at a distance from the position of the state transistor TE, projected into this plane, advantageously not exceeding the usual size of an etch by focused ion beam.

Figure 3:
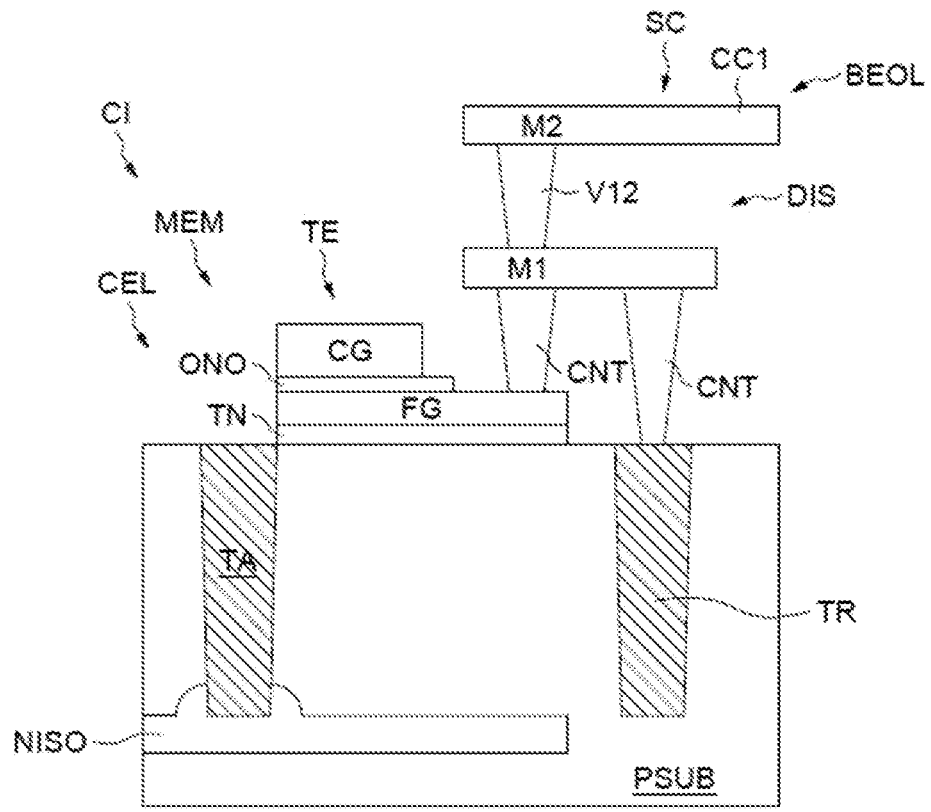
FIG. 3 shows one embodiment of a device DIS for protecting the data stored in the integrated circuit memory.

FIG. 3 shows one embodiment of the device DIS for protecting the data stored in the memory MEM of the integrated circuit CI, capable of detecting a machining by focused ion beam of the FIB type.

The memory cell CEL is identical to the memory cell described hereinbefore in relation with FIGS. 1A, 1B and 2. The elements of the memory cell CEL support the same references and are not detailed again here.

The device DIS further comprises, for its part, at least one trench filled with a conductive material TR.

The trench TR extends vertically in depth into the semiconductor substrate PSUB of the integrated circuit CI. The conductive material may be polycrystalline silicon. The trench filled with a conductive material is, for example, of the same design as the access transistor TA described hereinbefore in relation with FIGS. 1A and 1B.

For example, in the method of fabrication of the integrated circuit CI, the formation of the trench filled with a conductive material TR is implemented simultaneously with the formation of the access transistor TA. However, the buried semiconductor region NISO forming the source region of the access transistor TA is not necessary, but is not detrimental either, for the function of the trench filled with a conductive material TR for the data protection device DIS.

The conductive material filling the trench TR is electrically coupled to the floating gate FG of the state transistor TE.

For example, the coupling between the conductive material filling the trench TR and the floating gate FG may comprise a contact CNT connecting the trench TR with a track of the first metal level M1, the track being connected to the floating gate FG via another contact CNT.

Thus, the conductive material filling the trench will collect the charges from a beam of the FIB type, when a machining of the FIB type (implemented from the rear face of the substrate PSUB) reaches the bottom of the trench TR. Thus, the charge on the floating gate will be modified, and hence the information that this charge represented will be lost.

The trench filled with a conductive material is advantageously formed near to the respective state transistor TE, in order to optimize the chances of capturing the charged particles from a machining by FIB aiming to reach the state transistor TE via the rear face of the substrate PSUB.

The trench filled with a conductive material TR may be designed in such a manner as to cover a maximized surface area of the substrate (seen from above, the depth into the substrate being fixed by the method of fabrication), depending on the possibilities allowed by the other elements of the integrated circuit formed in and on the same substrate.

Furthermore, it may also be envisaged for the trench filled with a conductive material TR to be, for example, situated at a distance from the state transistor TE and for it to be coupled to its floating gate FG via a path within the interconnection levels BEOL, if such a position is advantageous in the architecture of the integrated circuit CI.

Figure 4:
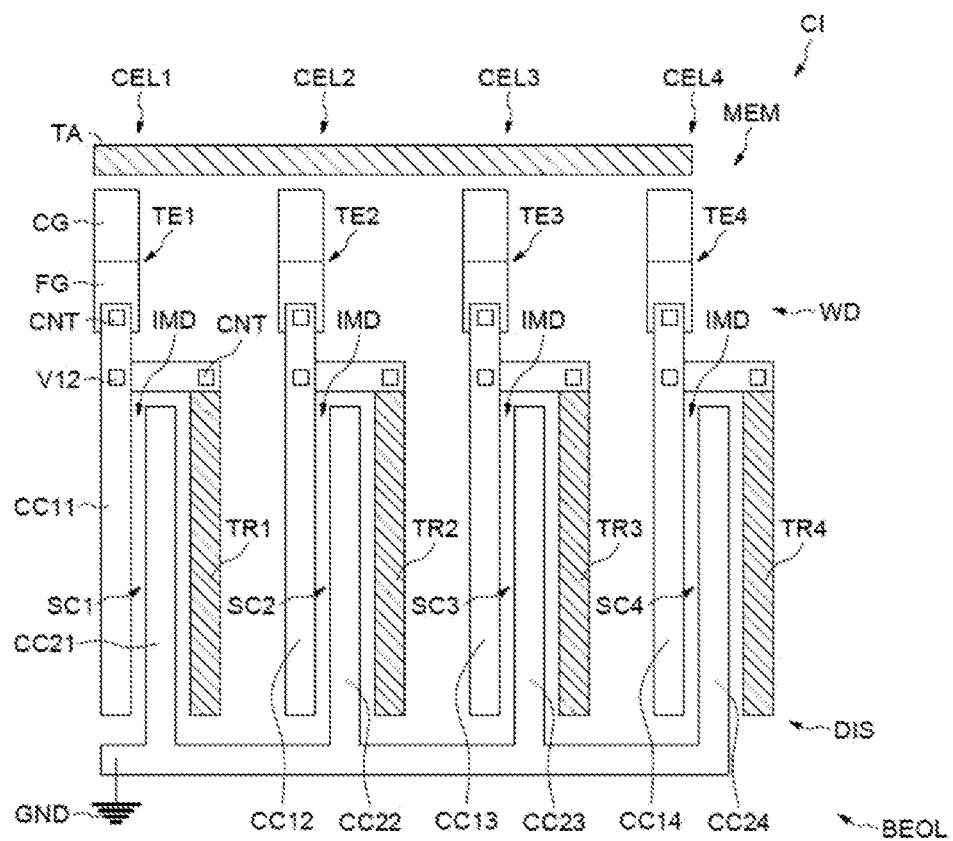
FIG. 4 shows a view from the top of the memory MEM of the integrated circuit CI as shown in FIG. 3.

FIG. 4 shows a view from the top of the memory MEM of the integrated circuit CI as shown in FIG. 3. The illustrated structure is substantially the same as shown and described in connection with FIG. 2. The top view of FIG. 4 further shows an exemplary positioning of the conductive material TR trench extending longitudinally in parallel with the first electrically-conducting bodies CC11-CC14 and the second electrically-conducting bodies CC21-CC24.

Figure 5:
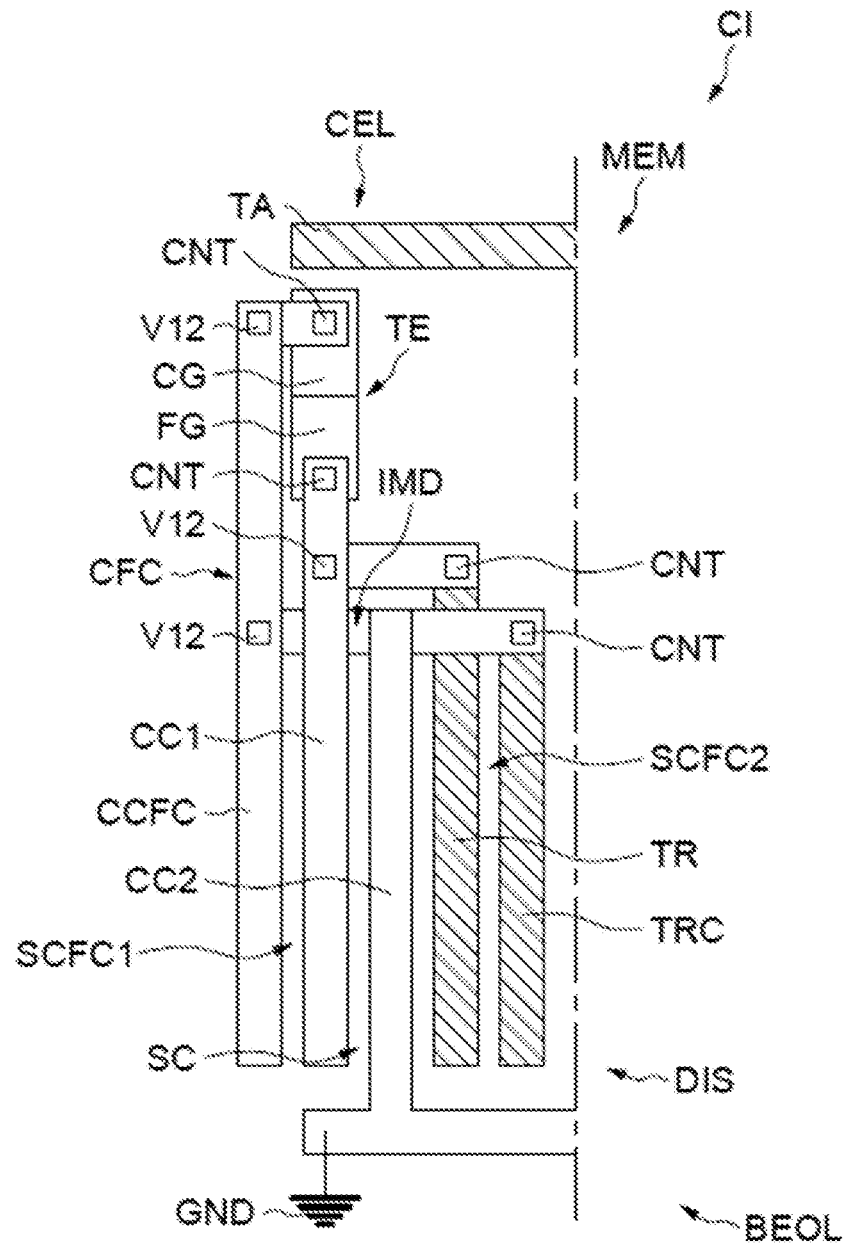
FIG. 5 shows a device for conservation of the coupling factor which allows an effect for reduction of the coupling factor of the memory cell to be compensated.

FIG. 5 shows one embodiment in which a device for conservation of the coupling factor CFC allows an effect for reduction of the coupling factor of the memory cell CEL to be compensated.

In this example, the device for conservation of the coupling factor CFC is described in relation with the embodiment of the memory cell CEL previously described in relation with FIGS. 3 and 4.

The common elements support the same references as given in relation with FIG. 3 and will not be detailed here again.

Although it has been described that the capacitive value of the capacitive structures SC may be configured in such a manner as to produce a negligible effect with respect to the coupling factor of the cell CEL, it is envisaged for a potential reduction of the coupling factor to be compensated with the conservation device CFC.

Indeed, the capacitive structures SC and the trenches TR intrinsically increase the stray capacitance between the floating gate FG and ground GND, and thus reduce the coupling factor of the cell CEL.

Compensating this reduction is one solution for configuring the capacitive structures SC in such a manner as to produce a negligible effect with respect to the coupling factor of the cell CEL, and thus to preserve the optimum coupling factor of the memory cell CEL.

The device for conserving the coupling factor CFC comprises a first compensation capacitive structure SCFC1, comprising a third electrically-conducting body CCFC coupled to the control gate CG of the state transistor TE, and configured so as to be capacitively coupled with the first electrically-conducting body CC1 of the capacitive structure SC1.

The first compensation capacitive structure SCFC1 is designed and configured to introduce a capacitive effect between the control gate CG and the floating gate FG of the state transistor TE, by means of the capacitive coupling between the third conducting body CCFC and the first conducting body CC1.

For example, in this example the first electrically-conducting body CC1 comprises a first metal track extending in a direction of the plane of the respective metal level, and the third electrically-conducting body CCFC comprises a third metal track, within the same metal level, alongside the first metal track.

The third metal track and the first metal tracks can be electrically isolated by the inter-metal dielectric IMD of this metal level, and be sufficiently close so as to introduce the desired capacitive coupling between the two electrically-conducting bodies CCFC, CC1.

The control gate CG of the state transistor TE is coupled to the third electrically-conducting body CCFC by means of a contact CNT, of metal levels and of vias V12 of the interconnection part BEOL.

It goes without saying that the presence of the third conducting body CCFC of the first compensation capacitive structure SCFC1 does not influence the functionality for protecting the data stored in the memory of the capacitive structure SC1.

Furthermore, the first compensation capacitive structure SCFC1 could perfectly well be applied to the embodiment in which the protection device DIS does not comprise a trench filled with a conducting body TR, such as previously described in relation with FIGS. 1A, 1B and 2.

Furthermore, the device for conservation of the coupling factor CFC comprises a second compensation capacitive structure SCFC2, comprising a second trench filled with a conductive material TRC, configured so as to be capacitively coupled with the trench filled with a conductive material TR of the data protection device DIS.

The conductive material filling the second trench TRC of the device for conservation of the coupling factor CFC is electrically coupled to the control gate CG of the state transistor TE.

Thus, the second compensation capacitive structure SCFC2 is designed and configured to introduce a capacitive effect between the control gate CG and the floating gate FG of the state transistor TE, by means of the capacitive coupling between the conductive materials of the two trenches TR, TRC.

For example, the coupling between the conductive material filling the second trench TRC and the control gate CG may comprise a path within the interconnection levels BEOL going via contacts CNT, metal tracks and vias V12.

It goes without saying that the presence of the second trench filled with a conductive material TRC of the second compensation capacitive structure SCFC2 does not influence the functionality for protecting the data stored in the memory of the first trench filled with a conductive material TR.

The invention claimed is:

1. An integrated circuit, comprising: a memory comprising a state transistor including a floating gate, wherein the state transistor is configured to store a charge representative of a respective data value in its floating gate;
   a device for protecting the respective data value stored in the memory comprising a capacitive structure which includes:
      a first electrically-conducting body coupled to the floating gate of the state transistor;
      a dielectric body; and
      a second electrically-conducting body coupled to a ground terminal;
   wherein the dielectric body is configured:
      in response to an aqueous solution brought into contact with the dielectric body, electrically couple the floating gate and the ground terminal so as to modify the charge on the floating gate and to lose the respective data value;
      otherwise, electrically isolate the floating gate and the ground terminal.

2. The integrated circuit according to claim 1, wherein the first electrically-conducting body and the second electrically-conducting body are situated within the same metal level of an interconnection part of the integrated circuit.

3. The integrated circuit according to claim 2, wherein the second electrically-conducting body has a shape matching at least a part of an outline of a shape of the first electrically-conducting body.

4. The integrated circuit according to claim 2, wherein the first electrically-conducting body comprises a first metal track extending in a direction of a plane of a respective metal level of the interconnection part of the integrated circuit, and the second electrically-conducting body comprises a second metal track extending alongside the first metal track.

5. The integrated circuit according to claim 1, wherein the memory further comprises another state transistor including another floating gate, wherein the device for protecting the data further comprises another capacitive structure, and wherein said capacitive structure and said another capacitive structure are situated within different metal levels of an interconnection part of the integrated circuit.

6. The integrated circuit according to claim 1, wherein the dielectric body comprises a material which is included within a layer of inter-metal dielectric of a metal level of an interconnection part of the integrated circuit within which the first and second electrically-conducting bodies are situated.

7. The integrated circuit according to claim 1, further comprising a first compensation capacitive structure including a third electrically-conducting body coupled to a control gate of the state transistor, the control gate lying over the floating gate, wherein the third electrically-conducting body is configured to be capacitively coupled with the first electrically-conducting body of the capacitive structure.

8. The integrated circuit according to claim 1, wherein the data protection device further comprises a first trench filled with a conductive material extending vertically in depth into a semiconductor substrate of the integrated circuit, the conductive material filling said trench being electrically coupled to the floating gate of the state transistor.

9. The integrated circuit according to claim 8, wherein the first trench is filled with a conductive material having a same structure and comprising a same material as a vertical gate of a buried access transistor coupled to the state transistor.

10. The integrated circuit according to claim 8, further comprising a second compensation capacitive structure including a second trench filled with a conductive material, wherein the conductive material filling the second trench is configured to be capacitively coupled with the conductive material filling the first trench of the data protection device.

11. The integrated circuit according to claim 10, wherein each of the first and second trenches is filled with a conductive material having a same structure and comprising a same material as a vertical gate of a buried access transistor coupled to the state transistor.

12. The integrated circuit according to claim 1, wherein the respective data value stored in the state transistor is data which is intended to be read in order to implement a function of the integrated circuit.

13. The integrated circuit according to claim 12, wherein the respective data value is data coding instructions for booting up the integrated circuit.

14. The integrated circuit according to claim 12, wherein the respective data value is data of an encryption/decryption key.

15. A circuit for protecting data stored in a memory of an integrated circuit, wherein the memory includes a state transistor having a floating gate, and wherein a respective data value is written into the state transistor by storage of a charge representative of the respective data value in the floating gate of the state transistor, the circuit comprising:
   a protection device for the state transistor which includes a capacitive structure having: a first electrically-conducting body coupled to the floating gate of the state transistor, a dielectric body, and a second electrically-conducting body coupled to a ground terminal;
   wherein the dielectric body is configured:
      in response to an aqueous solution brought into contact with the dielectric body, electrically couple the floating gate and the ground terminal so as to modify the charge on the floating gate and to lose the respective data value;
      otherwise, electrically isolate the floating gate and the ground terminal.

16. The circuit according to claim 15, wherein the first and second electrically-conducting bodies are located within a same metal level of an interconnection part of the integrated circuit.

17. The circuit according to claim 16, wherein the second electrically-conducting body has a shape matching at least a part of an outline of a shape of the first electrically-conducting body.

18. The circuit according to claim 16, wherein the dielectric body comprises a material included in the formation of a layer of inter-metal dielectric of the same metal level within which the first and second electrically-conducting bodies are located.

19. The circuit according to claim 16, wherein the first electrically-conducting body comprises a first metal track extending in a direction of a plane of the same metal level, and the second electrically-conducting body comprises a second metal track extending alongside the first metal track.

20. The circuit according to claim 16, further comprising a first compensation capacitive structure comprising a third electrically-conducting body coupled to a control gate of the state transistor, wherein the control gate lies over the floating gate, the third electrically-conducting body being configured to be capacitively coupled with the first electrically-conducting body.

21. The circuit according to claim 15, further comprising a first trench filled with a conductive material extending vertically in depth into a semiconductor substrate of the integrated circuit, the conductive material filling the first trench being electrically coupled to the floating gate of the state transistor.

22. The circuit according to claim 21, wherein the first trench has a same depth as a trench for a vertical gate region of a buried access transistor coupled to the state transistor.

23. The circuit according to claim 22, wherein the first trench and the trench for the vertical gate region are simultaneously fabricated during manufacture of the circuit.

24. The circuit according to claim 21, further comprising a second compensation capacitive structure including a second trench filled with a conductive material electrically coupled to a control gate of the state transistor, wherein the control gate lies over the floating gate, the conductive material filling the second trench configured to be capacitively coupled with the conductive material filling the first trench.

25. The circuit according to claim 24, wherein the second trench has a same depth as a trench for a vertical gate region of a buried access transistor coupled to the state transistor.

26. The circuit according to claim 25, wherein the second trench and the trench for the vertical gate region are simultaneously fabricated during manufacture of the circuit.

27. The circuit according to claim 15, wherein the respective data value stored in the state transistor is data which is intended to be read in order to implement a function of the integrated circuit.

28. The circuit according to claim 27, wherein the respective data value is data coding instructions for booting up the integrated circuit.

29. The circuit according to claim 27, wherein the respective data value is data of an encryption/decryption key.

* * * * *

UNITED STATES PATENT AND TRADEMARK OFFICE
CERTIFICATE OF CORRECTION

| | | |
|---|---|---|
| PATENT NO. | : 11,715,705 B2 | |
| APPLICATION NO. | : 16/932082 | |
| DATED | : August 1, 2023 | |
| INVENTOR(S) | : Pascal Fornara et al. | |

It is certified that error appears in the above-identified patent and that said Letters Patent is hereby corrected as shown below:

On the Title Page

The foreign priority information should be added:
– (30) Foreign Application Priority Data
Jul. 24, 2019 (FR) ............ 1908376 –

Signed and Sealed this
Seventh Day of May, 2024

Katherine Kelly Vidal
*Director of the United States Patent and Trademark Office*